(12) United States Patent
Liberman et al.

(10) Patent No.: US 8,329,811 B2
(45) Date of Patent: Dec. 11, 2012

(54) PROCESS FOR POLYMERIZATION IN THE PRESENCE OF NANOPARTICLES OF A MINERAL FILLER FOR THE ATTAINMENT OF POLYMER NANOCOMPOSITES, AND A POLYMER NANOCOMPOSITE

(75) Inventors: Susana Alcira Liberman, Porto Alegre-Rs (BR); Dihogenes Adriano Pozzer, Porto Alegre-Rs (BR); Fábio Fernandes Mota, Porto Alegre-Rs (BR); Olavo Martins Junior, Porto Alegre-Rs (BR); Manoel Lisboa Da Silva Neto, Porto Alegre-Rs (BR)

(73) Assignee: Braskem S.A., Camacari (BR)

( * ) Notice: Subject to any disclaimer, the term of this patent is extended or adjusted under 35 U.S.C. 154(b) by 0 days.

(21) Appl. No.: 12/739,645

(22) PCT Filed: Apr. 15, 2008

(86) PCT No.: PCT/BR2008/000106
§ 371 (c)(1), (2), (4) Date: Jun. 29, 2010

(87) PCT Pub. No.: WO2009/052595
PCT Pub. Date: Apr. 30, 2009

(65) Prior Publication Data
US 2011/0251343 A1 Oct. 13, 2011

(30) Foreign Application Priority Data

Oct. 25, 2007 (BR) ...................................... 0705815

(51) Int. Cl.
*A61K 9/16* (2006.01)
*C08L 23/00* (2006.01)
(52) U.S. Cl. ........................................ 524/543; 524/855
(58) Field of Classification Search ................... 524/543
See application file for complete search history.

(56) References Cited

U.S. PATENT DOCUMENTS

| | | | | |
|---|---|---|---|---|
| 5,883,173 | A * | 3/1999 | Elspass et al. | 524/446 |
| 6,649,713 | B2 * | 11/2003 | Wei et al. | 526/160 |
| 2002/0082331 | A1 * | 6/2002 | Mielewski et al. | 524/445 |
| 2007/0123630 | A1 * | 5/2007 | Lu et al. | 524/489 |
| 2008/0275164 | A1 * | 11/2008 | Scott et al. | 523/351 |

FOREIGN PATENT DOCUMENTS
WO WO 97/00910 1/1997

* cited by examiner

*Primary Examiner* — Hui Chin
(74) *Attorney, Agent, or Firm* — Birch, Stewart, Kolasch & Birch, LLP

(57) ABSTRACT

A process for polymerization in the presence of nanoparticles of a mineral filler for obtaining polymer nanocomposites which includes the steps of (a) mixing a mineral filler with a swelling agent in a liquid state or near a critical state or supercritical state; (b) subjecting the swelling agent of the mixture obtained in step (a) to an endoenthalpic or isoenthalpic phase change, by altering the conditions of temperature and/or pressure; and (c) polymerizing a monomer, in a continuous or a batch process, in the presence of the mixture of step (b); wherein the swelling agent is a saturated or unsaturated hydrocarbon, a polar or vinylic organic compound, the same monomer used in the polymerization reaction or an inert compound present as a component of the reaction medium.

17 Claims, 1 Drawing Sheet

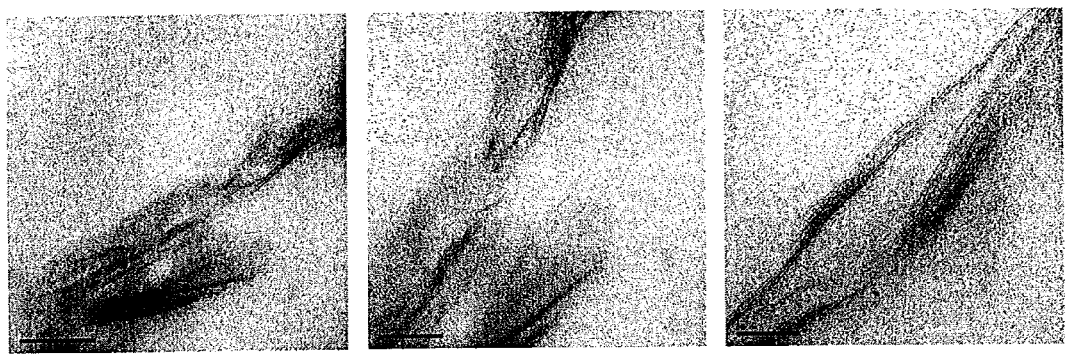

PROCESS FOR POLYMERIZATION IN THE PRESENCE OF NANOPARTICLES OF A MINERAL FILLER FOR THE ATTAINMENT OF POLYMER NANOCOMPOSITES, AND A POLYMER NANOCOMPOSITE

TECHNICAL FIELD

The present invention refers to a process for the preparation of high performance polymer nanocomposites by means of an in situ continuous or batch polymerization process. More specifically, in this process, the inorganic filler is previously swollen with a swelling agent consisting in a saturated or unsaturated hydrocarbon or a polar or vinylic organic compound, in liquid state or near the critical point or in supercritical state, in a stirred reactor with continuous flow or in batches, prior to being fed to a polymerization reactor. During the feeding of the swollen filler from the stirred reactor to the polymerization reactor, there occurs a depressurization of the mixture with sudden vaporization of the swelling agent and the obtainment of nanometric structures of the inorganic fillers in the polymerization reactor. With this process, mineral filler nanoparticles are incorporated and distributed evenly throughout the polymer matrix during the polymerization step, enabling the obtainment of a high performance polymer nanocomposite.

DESCRIPTION OF THE PRIOR ART

The polymer nanocomposites are hybrid materials formed of a polymer matrix and an inorganic material whereof at least one of the dimensions is in the nanometric scale. At this scale, this inorganic material has a strong influence on the macroscopic properties exhibited by the polymer, even when present in extremely low amounts. Among the macroscopic properties that may be cited there are included the thermal deflection temperature, flame resistance, mechanical properties, barrier properties, coefficient of expansion, thermal and electrical conductivity, and others. In view of the advantages evidenced by the polymer nanocomposites compared to conventional composites, the preparation of such nanocomposites is highly interesting from the technological point of view.

It should be pointed out that in the polymer nanocomposites, the mechanical properties, in addition to depending on the homogenous dispersion of the filler within the polymer matrix, are dependent on the interface binding forces between the inorganic material and the polymer matrix, and particularly on the interface binding area of the filler, which is determined by the aspect ratio (width/thickness). In this respect, the phyllosilicates and other spherical and/or sheet-like mineral fillers, such as expanded graphite, calcium nanocarbonate, nanometric metal oxides, etc., are pointed out in the field due to having dimensions in the nanometric scale and providing improvements in mechanical properties at levels in the order of 0.1 to 10% by weight of filler.

However, particularly in the case of polyolefins and other polymers, the simple physical mixture of a polymer with the phyllosilicate or other spherical and/or sheet-like fillers in their natural state does not lead to the formation of a high performance material due to the incompatibility of the polymers with the mineral fillers, resulting in agglomerates, rather than a fine dispersion, of nanometric particles within the polymer matrix. Thus, various techniques have been used for the preparation of nanocomposites, particularly in the field of polyolefins, such as melt mixing, in situ polymerization and mixing in liquid media, for the purpose of promoting the dispersion or exfoliation of the spherical and/or sheet-like mineral fillers, respectively, such as the phyllosilicates, expanded graphite, among others, within a polymer matrix. However, from the industrial point of view, only the first two techniques evidence economic, process and environmental feasibility, notwithstanding the excellent results reported in the literature in respect of the mixture in liquid media.

The preparation of nanocomposites based on mineral nanofillers, using a melt mixing technique, is one of the most widely used techniques for obtainment of high performance materials. However, many of the materials described in the literature evidence a morphology including aggregated material. Therefore, a total dispersion or exfoliation of a mineral nano filler has not been achieved to date, and thus the real potential of the mineral fillers has not yet been disclosed for low concentrations thereof.

The interest for polymer nanocomposites prepared by in situ polymerization has increased over last few years, particularly with relation to polyolefins. This is due to the fact that, compared with the traditional techniques for obtainment of polymer nanocomposites as cited above, the in situ polymerization evidences the advantage of excellent dispersion of the spherical and/or sheet-like mineral filler within the polymer matrix. In the case of sheet-like mineral fillers, the polymer material is generated in the inter-layer gaps of the fillers, thereby avoiding problems related to compatibility among materials. However, this technique requires the presence of catalysts or iniciators for the polymerization reaction in the inter-layer gaps of the mineral filler, and for this purpose there is required an additional step of preparation of nanocomposites to allow a chemical binding or adsorption of the catalyst in relation to the mineral filler. For example, in document U.S. Pat. No. 6,649,713 there is described a process for the preparation of polyolefins by in situ polymerization using a catalyst complex located in the inter-layer gaps of an organophilic phyllosilicate, which is comprised of a metallocene catalyst supported on nanometric particles of $TiO_2$ or silica incorporated into the inter-layer gaps by means of a sol-gel method.

In turn, the work described by Sang-Young A. Shing et al. (*Polymer Preprints*, 47-1 (2006) 32), evidences the ability of intercalation of monomers with vinyl groups into the inter-layer gaps of phyllosilicates for chemical (covalent) binding thereof to the surface of the layer of the phyllosilicate, and further evidences the ability of intercalation catalysts of the type $Cp_2ZrCl_2$ supported on the phyllosilicate, activated by methylaluminoxane (MAO) for the preparation of polymer nanocomposites reinforced with layered fillers of nanometric scale by means of polymerization in gas phase or slurry using ethylene as the monomer.

From the industrial perspective, the obtainment of nanocomposites by means of the previously cited processes in large scale is still commercially unfeasible due to the various chemical processes that must be used for purposes of physical and chemical modification of the mineral filler. However, the cited study envisioned the possibility of introducing small organic molecules, such as monomers, solvents, among others, within the inter-layer gaps of phyllosilicates.

The feasibility of introduction of unsaturated hydrocarbons in the inter-layer gaps of sheet-like fillers, in addition to those described in relation to the phyllosilicates, may be observed in the work described by Chaganti S. Reddy et al. (*J. Macromol. Sci. Part A: Pure Appl. Chem.* 43 (2006) 1365), disclosing the polymerization of propylene, in gas phase, within the inter-layer gaps of kaolin, using metallocene catalysts of the zircocene type supported on silica for the obtainment of polypropylene nanocomposites.

Some researchers report the use of supercritical $CO_2$ to exfoliate phyllosilicates, for example, we may cite the work reported by M. Kannan et al. (*Polymer*, 47 (2006) 7485), for the treatment of various natural, hydrophilic and organophilic phyllosilicates. The technique used by the researchers is based on the ability $CO_2$ in supercritical state to interact physically and chemically with the spherical and/or sheet-like mineral fillers, thereby reducing the enthalpic and entropic barriers and facilitating the exfoliation of the sheet-like mineral filler. In the cited work, results indicated that the phyllosilicates can be exfoliated with supercritical $CO_2$ and that the extent of such exfoliation depends on the polarity of the phyllosilicate, and in the case of organophilic phyllosilicates, depends on the affinity of the organic modifier, such as quaternary ammonium salt, with the $CO_2$ in the supercritical state. After the exfoliation step, there is reported a subsequent step of mechanical mixing for the obtainment of the exfoliated phyllosilicate.

In document No. US 2002/6,469,073 B1 there is described a method of exfoliating or delaminating sheet-like phyllosilicates by contacting the same with $CO_2$ in supercritical state ($CO_2$ at 80° C. and 1,700 psig) for 5 hours, followed by radical depressurizing. Subsequently, the phyllosilicate layers of nanometric scale were mixed with polypropylene in a mechanical mixer in order to obtain a reinforced material. Notwithstanding the fact that there is obtained a nanocomposite, the procedure described in this document also requires the use of two steps, leading to increased cost of the obtained product. Specifically, in a mechanical mixing procedure the polymer material must be subjected to high temperatures and high shearing rates to provide a composite exhibiting the layered phyllosilicate exfoliated, pretreated, homogeneously dispersed throughout the polymer matrix, and such aim is not always achieved due to the high viscosity of the polymer materials in molten state.

In turn, document No. US 2004/6,753,360 B2 describes a method of preparing nanocomposites where the supercritical fluid, specifically supercritical $CO_2$, is injected into an extruder upon mixing of the polymer with the phyllosilicate, where the interval of permanence in the extruder, in the cited example, is from 1 to 5 minutes, with the depressurization occurring when the molten polymer mass emerges from the extruder, from a condition at 1,700 psig and 200 deg. C. to conditions of atmospheric pressure and ambient temperature. In this document, the authors propose that the supercritical fluid has the ability of swelling the polymer matrix in the molten state, and therefore there occurs a decrease of viscosity of the molten material, which would allow the layered phyllosilicates to be intercalated in the polymer matrix, and subsequently exfoliated during the depressurization of the system at the output of the material from the extruder. However, in this work, the authors did not evidence having achieved a partial or complete exfoliation of the layered mineral filler or the preparation of a high performance material. Furthermore, a processing with such long times of permanence in the extruder may lead to significant loss of mechanical properties due to degradation of the polymer chains.

On the other hand, patent Nos. US 2005/6,927,250 B2 and US 2006/7,105,108 B2 describe a method to expand sheet-line graphite using fluids, particularly $CO_2$ or water in supercritical state, for the subsequent preparation of graphite nanocomposites by mechanically mixing the said graphite with a polymer material.

The documents listed herein still lack a viable and economical solution for the obtainment of polymer nanocomposites in large scale production. Furthermore, in the process of in situ polymerization, which represents the most interesting methodology from the industrial perspective, the $CO_2$ and water in supercritical state would not be feasible to use in connection with some polymers, particularly the polyolefins and others, due to being poison to the commonly used catalyst systems. Even for polymerization systems not subject to such limitation, the use of $CO_2$ would represent an additional raw material that would increase the costs of the process. Therefore, the use of the same monomers or inert chemical compounds that participate in the polymerization reaction, for the exfoliation of phyllosilicates or the dispersion of spherical nanoparticles, constitutes an attractive alternative that is highly interesting from the industrial point of view for the production of polymer nanocomposites.

OBJECTS OF THE INVENTION

The object of the present invention is to provide a process for the preparation of polymer nanocomposites by in situ polymerization in a continuous or a batch process, wherein a sheet-like (layered) or spherical mineral filler is directly introduced in the polymerization reactor upon attaining nanometric scale with the aid of a swelling agent, consisting in a saturated or unsaturated hydrocarbon or a polar or vinylic organic compound, in liquid state or near the critical point or in the supercritical state, wherein the said swelling agent is the same monomer used in the polymerization reaction or an inert chemical compound that is a part of the reaction medium, thereby obviating the step of separation of the swelling agent used prior to the polymerization reaction.

One other object of the present invention is the provision of a nanocomposite wherein the spherical and/or layered fillers, dispersed and exfoliated, are distributed homogeneously throughout the polymer matrix during the polymerization step, allowing the obtainment of a polymer nanocomposite with improved mechanical and barrier properties, improved chemical and thermal resistance, and furthermore, in the case of a layered filler, the obtainment of an electrically and thermally conductive polymer nanocomposite.

Another object of the invention is to provide a process of high technological interest, that is, with low cost, simplicity and high productivity without the need of developing new production processes in the petrochemical industries. Therefore, the present invention provides a simple methodology for producing polymer nanocomposites.

SUMMARIZED DESCRIPTION OF THE INVENTION

The present invention refers to a process for the production of polymer nanocomposites comprising in situ polymerization, in a continuous process or a batch process, of monomers in the presence of a layered or spherical mineral filler, having been introduced directly into the polymerization reactor upon being treated with the monomer itself or with an inert compound that is part of the reaction medium, in liquid state or near the critical point or in supercritical state, to provide the exfoliation or dispersion thereof. The spherical-like or sheet-like (layered) mineral fillers may be of the types of natural or synthetic phyllosilicates, micas, kaolinites, graphite, calcium nanocarbonate, nanometric oxides, among others.

In the present invention, the mineral filler is contacted with a saturated or unsaturated hydrocarbon or a polar or vinylic organic compound, in liquid state or near the critical point or in supercritical state, that will act as a swelling agent. Subsequently, the system is subjected to isoenthalpic phase change (supercritical state) or endoenthalpic phase change (state of equilibrium or supercritical state) of the swelling agent, by means of alteration of the conditions of pressure and/or temperature for exfoliation or dispersion of the mineral filler at the nanometric level, to thereby provide the in situ polymerization, in a continuous process or a batch process, of the monomer in the presence of the mineral, in order to obtain a polymer nanocomposite. The said swelling agent is the same monomer that is used in the polymerization reaction or an inert compound that is a part of the reaction medium, thereby dispensing the step of separation of the swelling agent used prior to the polymerization reaction.

DESCRIPTION OF THE FIGURES

The advantages and characteristics of the present invention will be further evidenced by the description provided herein of the preferred embodiments thereof, given as examples and not for purposes of limitation, and by the figures to which the embodiments refer, wherein:

FIG. 1 is an illustration provided by means of electronic transmission microscopy, showing the exfoliation of the layers of the organophilic phyllosilicate in the thermoplastic matrix obtained by means of the process according to the present invention.

DETAILED DESCRIPTION OF THE INVENTION

The present invention consists in a process for the preparation of polymer nanocomposites by in situ polymerization, in a continuous process or a batch process, of monomers in the presence of exfoliated spherical-like or sheet-like (layered) mineral fillers, whereof at least one of the dimensions is in nanometric scale.

Specifically, in this invention the spherical or layered mineral filler is mixed in a reactor under stirring with a swelling agent consisting in a saturated or unsaturated hydrocarbon or a polar or vinylic organic compound, in liquid state or near the critical point or in supercritical state, the swelling agent being subsequently subjected to endoenthalpic or isoenthalpic phase change to provide a nanometric filler fully dispersed within the reaction medium, followed by in situ polymerization of the monomer. The said swelling agent is the same monomer used in the polymerization reaction or an inert compound comprised in the reaction medium, thereby dispensing the step of separation of the swelling agent used prior to the polymerization reaction. The endoenthalpic or isoenthalpic phase change occurs most preferably at the time of transfer of the mixture containing the mineral filler and the swelling agent in liquid state or near the critical point or in supercritical state, to the polymerization reactor, wherein are provided conditions of pressure and/or temperature that allow the said phase change and the consequent expansion of the swelling agent by sudden vaporization.

In a most preferred embodiment, the process of in situ polymerization in a continuous process or a batch process for the preparation of nanocomposites according to the present invention comprises the steps of:

1. Subjecting the spherical-like or sheet-like (layered) mineral filler to a thermal treatment at a temperature range of from 60 to 120 deg. C., preferably between 80 and 100 deg. C., for a period of time varying between 2 and 12 hours, preferably from 4 to 8 hours, using a dynamic drying system that may consist in a fluidized bed or a stirred vessel heated with an inert gas flow or similar systems able to provide an efficient drying of the filler. Alternatively, after the drying step, there may be used a chemical treatment for removal of contaminants, for example, using aluminum alkyls.
2. Feeding a continuous or batch stirred flow reactor, preferably a reactor of the CSTR type, with the dry mineral filler.
3. Adding to the said reactor a swelling agent, consisting in a saturated or unsaturated hydrocarbon or a polar or vinylic organic compound, at a ratio of 1 to 50% by weight, preferably 1 to 20% by weight of mineral filler in relation to the swelling agent.
4. Subjecting the reactor to temperature and pressure conditions whereby the swelling agent is in liquid state or near the critical point or in supercritical state, such conditions being dependent on the selected swelling agent. The time of contact of the mineral filler with the swelling agent within the reactor varies from 1 to 10 hours, preferably between 2 and 6 hours.
5. The mixture of Item 4 is transferred to the continuous or batch polymerization reactor. During the transfer of the swollen filler from the CSRT type reactor to the polymerization reactor there occurs a depressurization of the mixture with sudden vaporization of the swelling agent and obtainment of nanometric structures of the inorganic fillers in the polymerization reactor. The polymerization reactor should be of the types of gas phase in vertical fluidized bed, mass, solution or slurry types, among others.
6. Adding to the continuous or batch polymerization reactor the monomers, catalysts or iniciators, activators and/or polymerization enhancing agents, and conducting the polymerization according to the selected polymerization process. During this step the mineral filler nanoparticles are incorporated and homogeneously dispersed throughout the polymer matrix, allowing the obtainment of a high performance polymer nanocomposite.

The mineral fillers according to the present invention may be spherical-like or sheet-like (layered) fillers. In the case of the spherical fillers the same may consist in metal oxides, such as $ZnO$, $CdO$, $Cu_2O$, $TiO_2$, $Al_2O_3$, $SiO_2$, $Fe_3O_4$, among others, $CaCO_3$, silver particles, etc. The sheet-like fillers may be hydrophilic or organophilic natural or synthetic phyllosilicates, kaolinites, graphite, among others, which grain size does not necessarily have to be in nanometric scale, due to the fact that the process according to the present invention is capable of exfoliating the layers at the nanometric level. Furthermore, other nanometric scale inorganic fillers may be used as reinforcements for the polymer material, such as carbon nanotubes, cellulose nanofibers, among others. In the process described and claimed herein, the mineral filler should be used in proportions allowing obtaining a content in the range of 0.1 to 10% by weight based on the total weight of the final nanocomposite obtained.

In the case of the phyllosilicates, the same may be modified or not with intercalated cations (organic surfactant), for example, any quaternary onium ion (cations) such as ammonium, phosphonium, sulphonium or the mixture thereof. When the phyllosilicate is organophilically modified with an onium ion exhibiting one or more alkyl chains ($C_{12}$ to $C_{18}$), there will be observed an excellent chemical affinity with the hydrocarbons or monomers, and furthermore, the phyllosilicate will evidence greater basal spacing compared with the natural phyllosilicates, thereby facilitating an enhanced dispersion of the hydrocarbons and monomers in those spaces, leading to an efficient swelling of the sheet-like mineral filler. However, the time of contact required between the swelling agent consisting in a saturated or unsaturated hydrocarbon or a polar or vinylic organic compound, in liquid state or near the critical point or in supercritical state, and the mineral filler, in addition to depending on the type of the filler, shall depend on the grain size characteristics of the mineral.

The polymer nanocomposites obtained by the present invention may be obtained from a wide variety of olefin monomers, including $C_{2\text{-}20}$ olefins. Preferably, there are employed conjugated and non-conjugated olefins and dienes, such as ethylene, propylene, 1-butene, 1-pentene, 1-hexene, 1-octene, 4-methyl-1-pentene, butadiene, isoprene and copolymers thereof, as well as vinyl chloride, acrylic monomers, styrene, among others. More preferably, there are employed homopolymers and copolymers comprised of propylene and ethylene, and/or mixtures thereof.

As inert compounds there may be used hydrogen, plasticizers, saturated hydrocarbons and others, which may optimize the density and the interaction between the monomers and the filler, to thereby improve the dispersion and/or the solubility of the monomer molecules in the mineral filler or to help regulating the pressure in the polymerization reactor.

The polymer nanocomposites obtained by means of the process described and claimed herein exhibit the dispersed or exfoliated spherical and/or sheet-like (layered) fillers distributed homogeneously throughout the polymer matrix, resulting in low densities, better mechanical and barrier properties, greater chemical and thermal resistance, and further in the case of a conductive sheet-like filler, the obtainment of a thermally and electrically conductive polymer composite.

EXAMPLES

In order to allow a better understanding of the present invention and to clearly evidence the technical progress having been achieved, there now will be presented the results of the Examples, comprising nanocomposites obtained by means of a continuous production process as described and claimed herein, and Comparative Examples, wherein were used conditions anticipated in the prior art for the obtainment of polypropylene and polyethylene in Gas Phase.

Examples 1 and 2 correspond to the method of preparation of the high performance polypropylene nanocomposites with a phyllosilicate content of 2 and 3% by weight, respectively, based on the total weight of the final nanocomposite obtained. Example 3 corresponds to a polyethylene nanocomposite with a phyllosilicate content of 4% by weight, respectively, based on the total weight of the final nanocomposite obtained. In Examples 1 and 2, there was used as a sheet-like mineral an organophilic phyllosilicate, specifically the I.44 clay from Nanocor®, as the monomer there was used propylene, and as swelling agent there was used the propylene itself. In Example 3, there was used ethylene as the monomer, and propane as the swelling agent.

In the Examples, the inorganic filler used was previously dried at a temperature of 150 deg. C. for 8 hours in a stirred vessel with a nitrogen flow, and subsequently the inorganic filler was placed in a transfer cylinder connected to a vessel (CSRT type reactor) containing the swelling agent, wherein the final ratio of swelling agent:inorganic filler was 90/10 by weight. Subsequently, the mixture contained in the vessel was subjected to a pressure of 30 kgf/cm$^2$ at ambient temperature. After being stirred for 4 hours, the mixture was transferred at a flow rate of 1 kg/h to a continuous reactor, in stationary state of polymerization, specifically a vertical fluidized bed Gas-Phase type reactor. In these Examples, the pressure drop between the two reactors corresponded to 10 kgf/cm$^2$, while the temperature increased by 60 deg. C.

Additionally, Comparative Examples 1 and 2 were conducted according to the previously described methodology in the absence of the phyllosilicate type sheet-like mineral, for the preparation of polypropylene and polyethylene, respectively.

The mechanical properties of the nanocomposites prepared in the cited Examples were evaluated from injected and according to the standards and/or methodologies described in the following:

1) Melt index: The melt index (MI) of the nanocomposite was determined according to the method prescribed in standard ASTM D-1238L.
2) Rigidity: The rigidity of the nanocomposite was determined by measuring the Flexural Modulus according to the method prescribed in standard ASTM D-790.
3) Impact strength: The Izod impact strength was evaluated according to the method described in standard ASTM D-256 and the tensile impact strength was evaluated according to standard ASTM D-1822 at 23 deg. C.
4) The thermal deflection temperature of the nanocomposite was evaluated according to the standard ASTM D-648.
5) The durometer hardness of the nanocomposites was evaluated according to the test methods prescribed in standard ASTM D-2240.

The results of the above referred tests, corresponding to the materials obtained in the Examples cited above, are shown in TABLE 1 and TABLE 2 for polypropylene and polyethylene nanocomposites, respectively.

TABLE 1

| | Samples | | |
|---|---|---|---|
| | Example 1 | Example 2 | Comparative example 1 |
| Percentage of phyllosilicate (%) | 2.0 | 3.0 | — |
| MI (g/10 min) | 2.0 | 1.6 | 1.5 |
| Mechanical Properties | | | |
| Flexural Modulus (MPa) | 1,840 | 2,000 | 1,480 |
| Izod Impact Strength (23 deg. C.) J/m | 55 | 61 | 39 |
| Rockwell Hardness (R scale) | 99 | 101 | 81 |
| Thermal Properties | | | |
| HDT 0.455 MPa (deg. C.) | 111 | 116 | 89 |
| HDT 1.820 MPa (deg. C.) | 61 | 59 | 53 |

TABLE 2

| | Samples | |
|---|---|---|
| | Example 3 | Comparative example 2 |
| Percentage of phyllosilicate (%) | 4.0 | — |
| MI (190 deg. C./5 kg) | 0.36 | 2.70 |
| Mechanical Properties | | |
| Flexural Modulus (MPa) | 1,330 | 1,395 |
| Izod Impact Strength (23 deg. C.) J/m | 127 | 43 |
| Tensile Impact Strength | 246 | 216 |
| Shore D Hardness (15 seconds) | 56 | 57 |
| Thermal Properties | | |
| HDT 0.455 MPa (deg. C.) | 73 | 75 |

Firstly, upon an analysis of Tables 1 and 2, it is possible to note that the nanocomposites prepared in accordance with the present invention, Examples 1, 2 and 3, evidenced properties that were clearly superior to those of the polypropylene and polyethylene of the comparative examples, evidencing the incorporation of the mineral filler into the polymer matrix. Furthermore, it may be noted that the mechanical and thermal properties are dependent on the amount of phyllosilicate present in the polymer matrix, and that there is an excellent balance between the flexural modulus and the impact strength.

Specifically, by means of the present invention it has been possible to achieve an increase in these properties that has not been reported to date in relation to polyolefin nanocomposites obtained by in situ polymerization in a continuous process. For instance, when one compares Example 1 of Table 1 with the sample of Comparative Example 1 (polypropylene obtained in the same experimental conditions without using an organophilic silicate), it has been observed that the nanocomposites evidence an increase of Flexural Modulus of about 24%, specifically from 1480 to 1840 MPa, together with a substantial improvement of the Izod impact strength property, from 39 to 55 J/m, with a specific increase of 41%. There was also observed an increase of 25% in the thermal deflection temperature (HDT) from 89 to 111 deg. C. On the other hand, upon comparing the properties of the nanocomposite prepared in Example 2 with those of Comparative Example 1 in Table 1, we may note an increase of 35%, 56% and 30% of the flexural modulus, the impact strength and the HDT value, respectively. It should be pointed out that the nanocomposites prepared herein also evidence an increase in the property of Rockwell hardness, specifically an increase of 22%, depending on the amount of inorganic filler present in the polymer matrix. In Table 2, in turn, it may be noted that the polyethylene nanocomposite, Example 2, evidences a substantial increase in the flexural modulus compared to Comparative Example 2, there being specifically observed a 195% increase of this property, while the other properties remain constant.

FIG. 1 shows transmission electron microscopy images of the nanocomposite of Example 1, wherein there may be noted layers of the organophilic silicate exfoliated in the polypropylene matrix with a mean thickness of 1.1 nm, which provide a substantial improvement of the mechanical and thermal properties of the polypropylene.

Although the invention was described based on exemplary embodiments thereof, it should be understood that there may be introduced modifications thereto by technicians skilled in the art without departing from the inventive scope thereof.

The invention claimed is:

1. A process of polymerization in the presence of nanoparticles of a mineral filler for obtaining polymer nanocomposites, which consists of
   (a) mixing a mineral filler with a swelling agent in a liquid state or near a critical state or supercritical state;
   (b) subjecting the swelling agent of the mixture obtained in step (a) to an endoenthalpic or isoenthalpic phase change, by altering the conditions of temperature and/or pressure; and
   (c) polymerizing a monomer, in a continuous or a batch process, in the presence of the mixture of step (b); wherein the swelling agent is a saturated or unsaturated hydrocarbon, a polar or vinylic organic compound, the same monomer used in the polymerization reaction or an inert compound present as a component of the reaction medium.

2. The process as claimed in claim 1, wherein the mineral filler is a sheet-like (layered) filler or a spherical-like filler.

3. The process as claimed in claim 2, wherein the spherical-like mineral filler is selected from the group consisting of $ZnO$, $CdO$, $Cu_2O$, $TiO_2$, $Al_2O_3$, $SiO_2$, $Fe_3O_4$, $CaCO_3$, and silver particles.

4. The process as claimed in claim 2, wherein the sheet-like mineral filler is selected from the group consisting of hydrophilic or organophilic natural or synthetic phyllosilicates, micas, kaolinites, and graphite.

5. The process as claimed in claim 1, wherein the endoenthalpic or isoenthalpic phase change occurs at the time of the transfer of the mixture containing the mineral filler and the swelling agent, in liquid state or near the critical point or in supercritical state to the polymerization stage of the process.

6. The process as claimed in claim 5, wherein polymerization is conducted at temperatures and/or pressures (depressurization) allowing the said phase change, and consequently producing the expansion of the swelling agent by sudden vaporization.

7. The process as claimed in claim 1, wherein step (a) is preceded by a step of drying the mineral filler at a temperature of from 60 to 120 deg. C. for a time varying between 2 and 12 hours.

8. The process as claimed in claim 7, wherein the mineral filler is dried at a temperature of from 80 to 100 deg. C., for a time varying between 4 and 8 hours.

9. The process as claimed in claim 1, wherein the process is conducted in a stirred reactor.

10. The process as claimed in claim 1, wherein the swelling agent is added to the mineral filler in a proportion of 1 to 50% by weight based on the weight of the mineral filler.

11. The process as claimed in claim 10, wherein the swelling agent is added in an amount of 1 to 20% by weight based on the weight of the mineral filler.

12. The process as claimed in claim 1, wherein the duration of contact of the mineral filler with the swelling agent varies between 1 and 10 hours.

13. The process as claimed in claim 12, wherein the duration of said contact varies between 2 and 6 hours.

14. The process as claimed in claim 5, wherein the polymerization is conducted in a gas phase, mass, solution or sludge fluidization bed.

15. The process as claimed in claim 1, wherein the mineral filler is present in a range of 0.1 to 10% by weight, based on the total weight of the final nanocomposite obtained.

16. The process as claimed in claim 1, wherein the monomer is selected from the group consisting of ethylene, propylene, 1-butene, 1-pentene, 1-hexene, 1-octene, 4-methyl-1-pentene, butadiene, isoprene, copolymers thereof, vinyl chloride, acrylic monomers, and styrene.

17. The process as claimed in claim 1, wherein the inert compound is hydrogen, a plasticizer, or a saturated hydrocarbon.

* * * * *